(12) United States Patent
Honda

(10) Patent No.: US 6,253,415 B1
(45) Date of Patent: Jul. 3, 2001

(54) KNAPSACK ENGINE-DRIVEN TOOL

(75) Inventor: Tan Honda, Santa Rosa, CA (US)

(73) Assignee: Shin-Daiwa Kogyo Co., Ltd. (JP)

( * ) Notice: Subject to any disclaimer, the term of this patent is extended or adjusted under 35 U.S.C. 154(b) by 0 days.

(21) Appl. No.: 09/522,297

(22) Filed: Mar. 9, 2000

Related U.S. Application Data

(63) Continuation-in-part of application No. 09/320,836, filed on May 26, 1999, now abandoned.

(51) Int. Cl.$^7$ .................................................. A47L 5/14
(52) U.S. Cl. ................................................. 15/339; 15/405
(58) Field of Search .................. 15/327.5, 405, 15/339; 60/906

(56) References Cited

U.S. PATENT DOCUMENTS 4,552,100 * 11/1985 Kawaharazuka et al. ............... 123/2
5,813,088 * 9/1998 Wagner et al. ..................... 15/327.5

* cited by examiner

Primary Examiner—Chris K. Moore
(74) Attorney, Agent, or Firm—Liniak, Berenato, Longacre & White

(57) ABSTRACT

A knapsack engine-driven tool driven by an engine provided on a knapsack frame consists of a supporting tool composed of a hollow tube made of a flexible rigid material, preferably of brass, whose base end is fixed onto the knapsack frame, in which the flexible rigid material can be held at a desired shape, a member for operating said engine provided on the edge portion of the hollow tube, a regulating wire which is inserted into the hollow tube for connecting said engine and said operating member, and a flexible protective member for covering said hollow tube. The knapsack engine-driven tool has a metal fixing member, preferably made of iron.

14 Claims, 7 Drawing Sheets

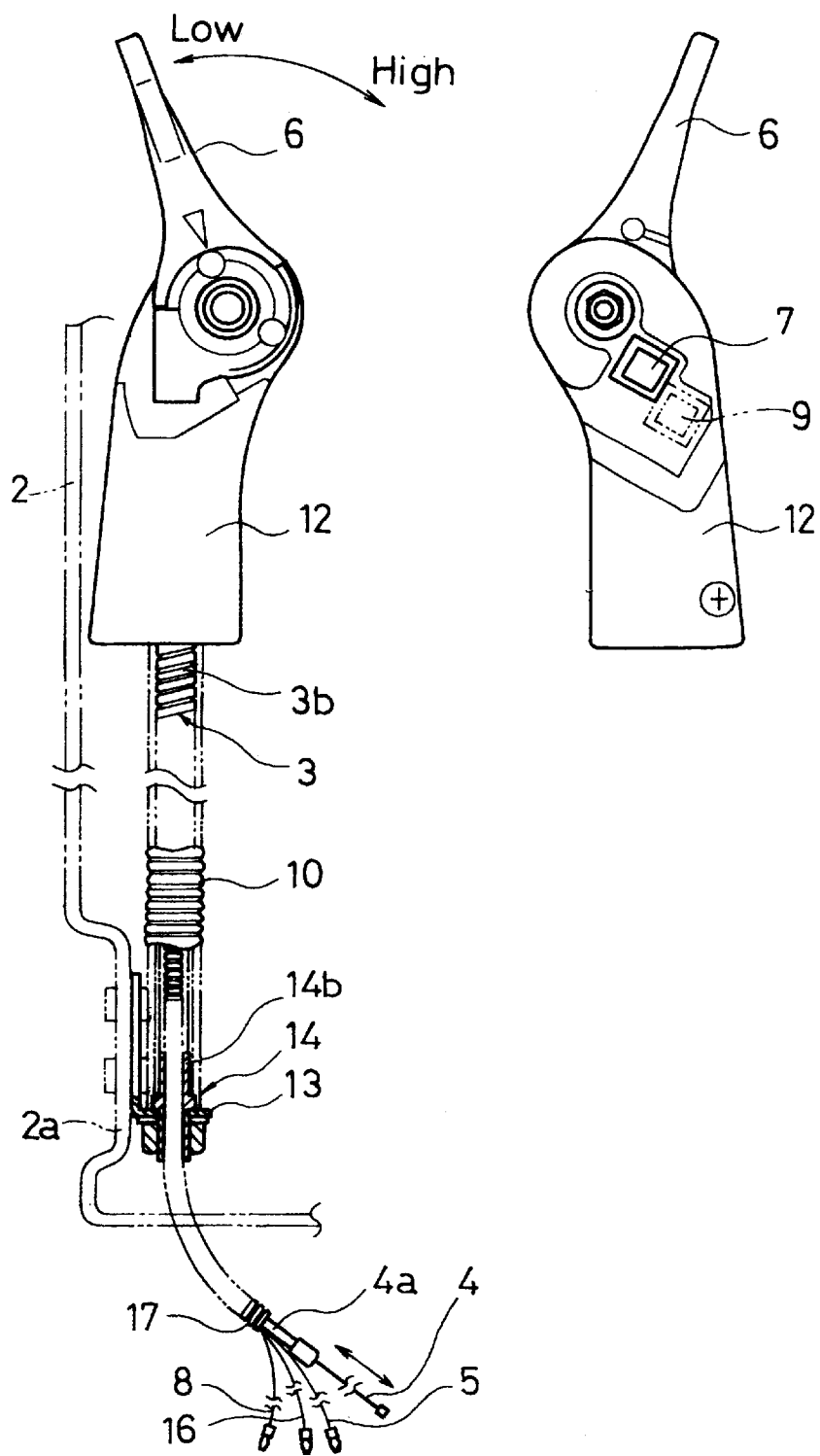

KNAPSACK ENGINE-DRIVEN TOOL

This application is a continuation-in-part of Ser. No. 09/320,836 filed on May 26, 1999 and now abandoned.

BACKGROUND OF THE INVENTION

1. Field of the Invention

The present invention relates to an improvement of a knapsack engine-driven tool, such as an engine-driven sprayer or and an engine-driven spray. More particularly, the invention relates to an improved knapsack engine-driven tool having an improvement in which the starting or stopping of the engine and can be made and the rotation speed of the engine can be regulated.

2. Description of the Related Art

As shown in FIG. 4 explaining prior art, the operating portion of the conventional knapsack engine-driven tool E has a knapsack frame A having an engine mounted thereon. The engine is equipped with the frame via a coil spring as a supporting member at a base portion B1 of a lower corner portion A1 of the knapsack frame A. Within the coil spring B, throttle wire C for operating a throttle of the engine and an electric wire for stopping the engine are inserted. To the edge B2 of the spring coil B is connected the edge of the throttle wire C, and a throttle lever is provided for operating it.

By providing such an operating means via a coil spring which can be freely bent, an operator can operate such a means at a position capable of being easily operated by picking it and bent to the desired position.

However, such a construction is disadvantageous in that the movable range is severely restricted not so as to set the position suitable for all of the operators. Also, even if the coil spring can be bent to a desired position, when the operator takes the hand from the coil spring such as at the time of finishing the operation, the coil spring is strongly returned to the original position (vertically), there being a risk to strongly hit the coil spring at the operator as shown on the broken line B' in FIG. 4. Moreover, when the operator wants to operate such an engine again, after the finishing of the operation, it becomes sometimes difficult to pick up the coil spring B' again.

In order to overcome such an disadvantage, Japanese Patent Laid-Open No. 10-299503 discloses the use of a sporting tool made of a semi-rigid material which can be held in a prescribed portion instead of the coil spring. According to this patent application, a shape of the supporting tool of the operating portion can be changed according to the force applied and, the desired shape can be held even after the removal of the force.

However, such a kind of tool is often roughly treated not only during the operation but also in the case of storage and custody. Consequently, in the case of the tool made of the semi-rigid material, the tool becomes defective when it is bumped to deform or destroy the tool, and such a tool is disadvantageous in terms of durability.

Furthermore, in the case of the tool made of the semi-rigid material, there is also problem associated with immediate deterioration due to friction etc., when the operating portion is frequently moved.

Moreover, in the semi-rigid material there is a fear of the change in the rigidity due to the difference in the temperature. In addition, such a tool is often used under severe conditions such as heating generated by the use of the driving source. For these reasons, it is difficult to say that the tool exhibit constant function even under any conditions.

On the other hand, the use of the semi-rigid material requires an expensive cost in terms not only of the material cost but also of the processing cost in comparison with a generally used material such as iron.

SUMMARY OF THE INVENTION

Consequently, an object of the present invention is to provide an economic knapsack engine-driven tool excelling in workability, and durability.

The present invention concerns a knapsack engine-driven tool driven by an engine provided on a knapsack frame, which consists of a supporting tool composed of a hollow tube made of a flexible rigid material, whose base end is fixed onto the knapsack frame and in which the flexible rigid material can be held at a desired shape, a means for operating said engine provided on the edge portion of the hollow tube, a regulating wire which is inserted into the hollow tube for connecting said engine and said operating means, and a flexible protective member for covering said hollow tube.

The rigid material is preferably made of iron or brass.

Such a construction makes it possible to provide an economic knapsack engine-driven tool excelling in workability, and durability.

When an experiment on durability has been carried out actually in the case in which a hollow tube is a flexible rigid material, the result was as follows. In this experiment, flexible pipe was used as a hollow tube.

When a worker moved a means for operating provided on the edge portion of the flexible pipe from the edge portion of the flexible pipe, which is straight, to a desired portion, the flexible pipe was not bend at the center of the flexible pipe equally. Specifically, the flexible pipe was bent in close vicinity to the edge portion, Therefore, the number of that the flexible pipe is bent in close vicinity to the edge portion are increased and a problem comes up in terms of durability.

A metal material is engaged in the edge portion so that the flexible pipe is swaged. As a consequence, the flexible pipe is prevented from being bent in close vicinity to the edge portion.

The metal material is preferably made of iron in terms of strength

BRIEF DESCRIPTION OF THE DRAWINGS

FIG. 1A is a side view of a knapsack engine-driven tool according to the present invention in which a part of the operating means is broken, FIG. 1B is a side view of the operating means, typically showing throttle bar and a switch for stopping the engine from the other side.

DESCRIPTION OF THE PREFERRED EMBODIMENTS

Figure 2A:
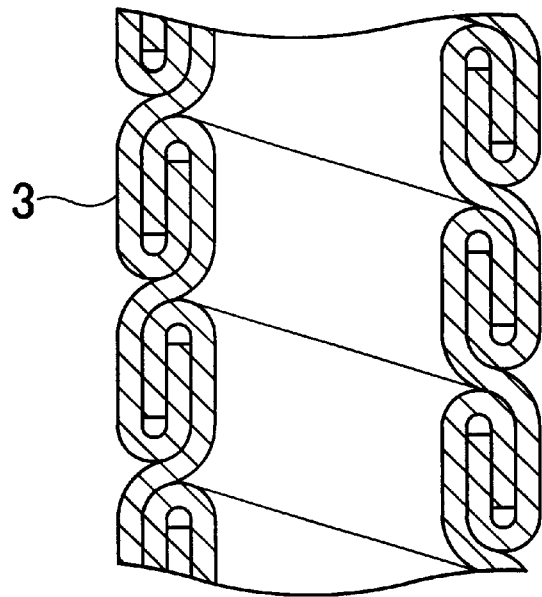
FIG. 2A is an enlarged cross-sectional view of a hollow tube made of the rigid material possessed by the knapsack engine-driven tool according to the present invention.

The present invention will now be described in detail by referring to the drawings.

Figure 3:
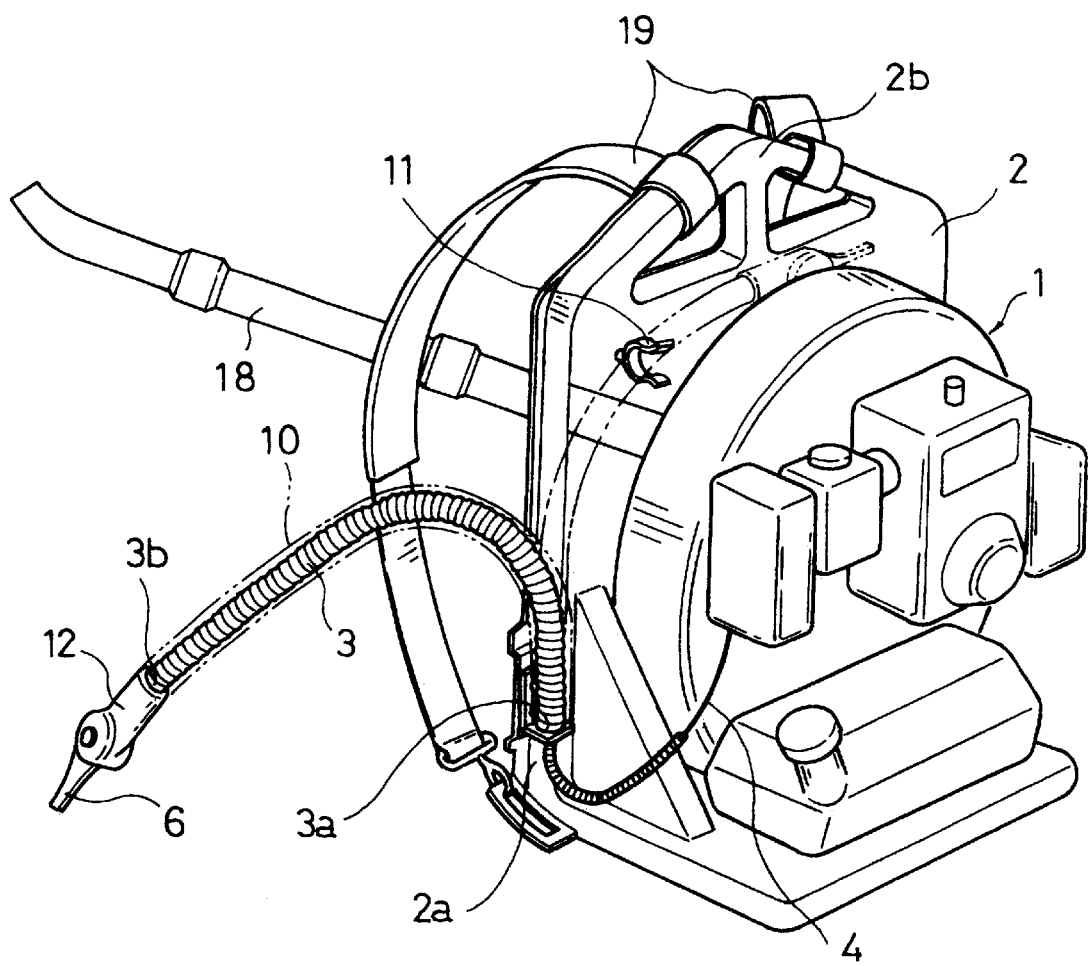
FIG. 3 is a perspective view of knapsack engine-driven tool according to the present invention shown from the back side.
Figure 4:
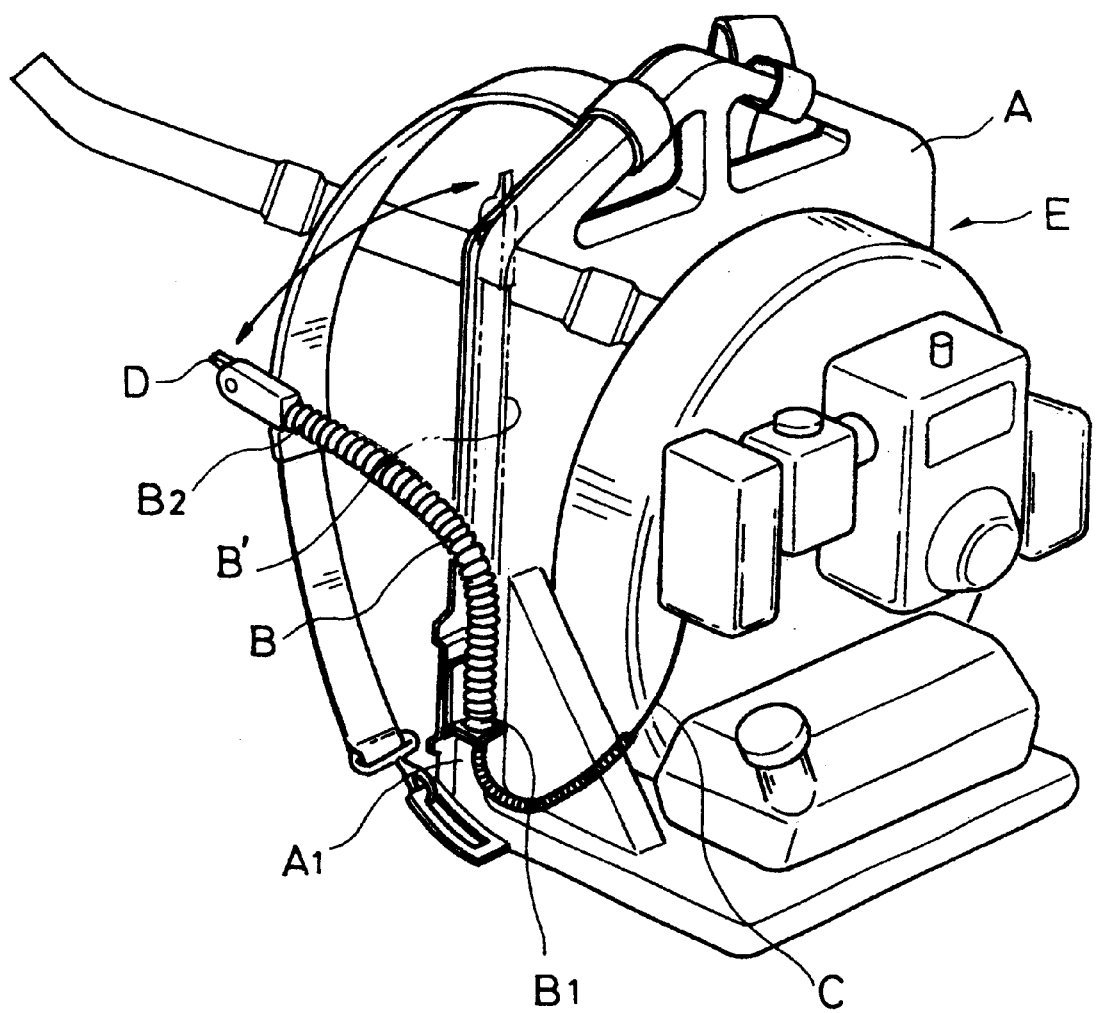
FIG. 4 is a perspective view of knapsack engine-driven tool according to the prior art shown from the back side.

As shown in FIG. 3, the present invention is mainly composed of an engine-driven tool 1, a knapsack frame 2, and an operating portion 30.

On the side thereof, the engine-driven tool 1 has a hose 18 for blowing fallen leaves, dusts, etc.

The knapsack frame 2 has shoulder straps 19 from the upper portion 2b to the bottom portion of the frame in order to be carried.

The operating portion 30 is composed of an operating means and a supporting tool. As shown in FIG. 1, the operating means is composed of a throttle lever 6, a stopping switch 7, and a starting switch 9. The supporting tool is composed of a hollow tube 3 made of a rigid material which can maintains its shape in a desired form.

The hollow tube 3 is fixed onto the knapsack frame 2 at a lower corner 2a (lower left corner in the embodiment shown in FIG. 3) via a base end portion 3a. Within the hollow tube 3, a throttle wire 4 for operating the throttle of the engine and a wire for starting or stopping the engine. A grip 12 is provided on the edge portion 3h of the hollow tube 3, a throttle lever 6, which is connected to the throttle wire 4 for operating the throttle of the engine and the wire for starting or stopping the engine, is provided on the edge of the grip 12 so that the engine-driven tool can be operated at hand.

The throttle lever 6 is an operating device for switching the rotation of the engine, and supported axially on the edge portion of the hollow tube 3 in such a manner that it is rotatable.

Figure 5:
FIG. 5 is a perspective view showing the use of the tool of FIG. 3 in a perspective view of knapsack engine-driven tool according to the present invention shown from the back side.

For example, as shown in FIG. 5, when the throttle lever 6 is picked by the thumb G and the index finger of the left hand, and is rotated to the direction of high speed (as shown in the arrow A of FIG. 1), the engine runs at a high speed. Conversely, if the operator revolve the lever 6 to the direction of low speed, the engine runs at a low speed.

In the case of starting the engine, the operator pushes the starting switch with the middle finger of the left hand, and when the engine is wanted to be stopped, the stopping switch is pushed.

The switch 9 for starting the engine and the switch 7 for stopping the engine may be a toggle switch instead of the push switch.

Figure 2B:
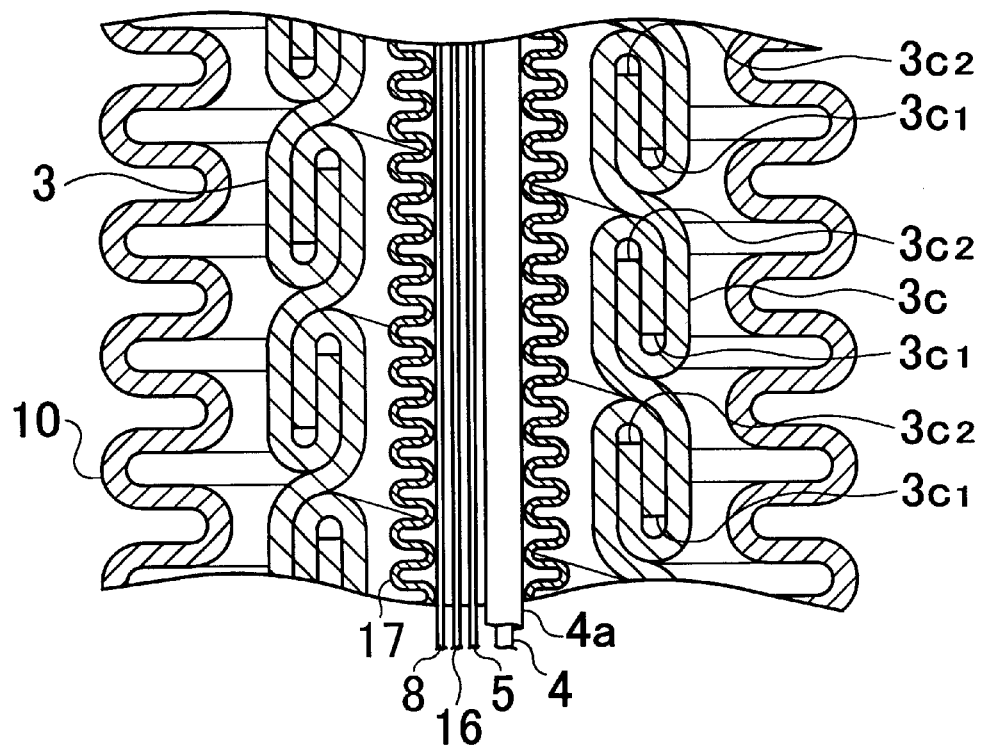
FIG. 2B is an enlarged cross-sectional view showing the state that the hollow tube is covered with a flexible protective tube and a regulating wire is inserted into the hollow tube.

The supporting tool will now be described. As shown in FIG. 2A and FIG. 2B, the hollow tube 3 which serves as the supporting tool has a construction that a band 3c made of a rigid material such as of iron, is bent and wound spirally so that both bent sides 3c, and 3C2 are adjacent to each other, and they are fitted to each other in such a manner that they can be movable. When the supporting tool is applied to a force to change its shape into a prescribed shape, it can maintain its shape.

FIG. 2B is an enlarged drawing showing the hollow tube in a zigzag form covered with a flexible protective tube 10.

As also shown in FIG. 1A, the flexible protective tube 10 is previously fitted to and covered with the hollow tube 3. One end thereof is fixed to a top portion 14b of a fastener 14 via a bracket 13 to be fixed onto the lower corner of the frame 2, and the other end there is fixed to the grip 12.

The flexible protective tube 10 is a member for protecting the hollow tube 3 from rust, or dust, and may be made of a material capable of freely bent together with the hollow tube as occasion may demand, and capable of maintaining the shape., e.g., a rubber or a plastic possessing character capable of maintaining the shape.

Numeral 17 depicted on FIGS. 1A and 2B represents a flexible protective tube which covers the throttle wire 4 covered with a throttle cable 4a, an electric wire 5 for stopping the engine, an electric wire 8 for starting the engine, and a wire 16 which is connected to a negative pole all at once. The protective tube 17 is flexible according to the bending of the hollow tube 3 and, thus the whole of the supporting tool is flexible.

Numeral 11 depicted on FIG. 3 shows a member for fixing the end of the hollow tube 3 provided not so as to be obstacle during the course of the storage or transportation when the engine-driven tool is not used.

As constructed above, an operator can set the position of the throttle lever 6, the starting switch 9, and the stopping switch 7 at a position ensuring an easy operation, and even when the operator leaves his hand from the hollow tube 3 in the bent state, the bent state can be maintained. Accordingly, the operability of the knapsack engine-driven tool is improved.

The hollow tube made of a rigid material results in excellent durability to various severe conditions, such as external impact, friction due to frequent repetition of bending and returning the hollow tube.

Moreover, use of a general material such as iron suppresses not only the material cost but also, processing cost.

Furthermore, covering the hollow tube with a flexible protective tube prevents the deposition of dust, rusting due to rain, and change of the bending ability for the worse.

While the invention has been described in detail and with reference to specific embodiments thereof, it will be apparent to one skilled in the art that various changes and modifications can be made therein without departing from the spirit and scope thereof.

Figure 6:
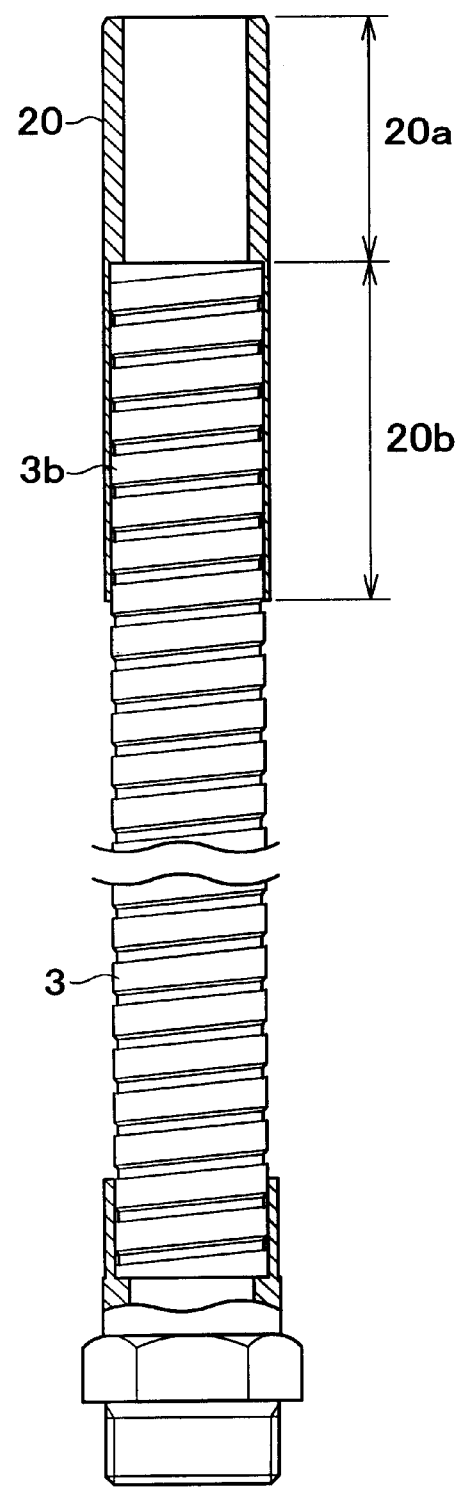
FIG. 6 is a side view of the hollow tube of the knapsack engine-driven tool according to the present invention in the state in which a metal fixing member is engaged in the hollow tube.
Figure 7:
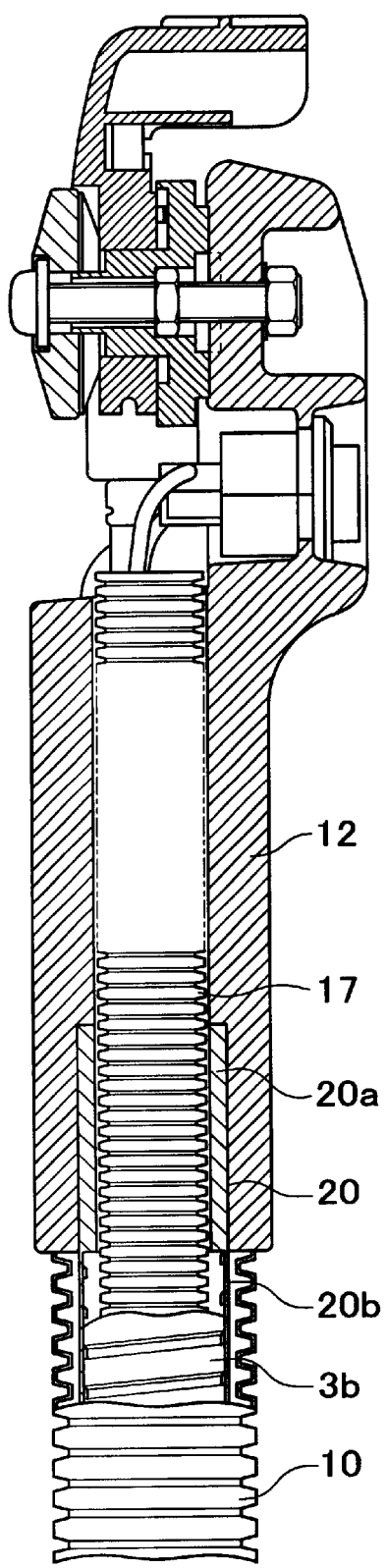
FIG. 7 is a side view of the operating means of the knapsack engine-driven tool according to the present invention in the state in which a grip is fitted on the metal fixing member.

As shown in FIG. 6 and 7, a metal fixing member 20 is made of a thick portion 20a and a thin portion 20b. The thin portion 20b is engaged in the edge portion 3b of the hollow tube 3. When a worker F in FIG. 5 grips the grip 12 and operates the engine-driven tool 1, the thin portion 20b swages the edge portion 3b of the hollow tube 3, therefore, the hollow tube 3 is not bent in close vicinity to the edge portion 3b.

Accordingly, the hollow tube 3 is bent in closer vicinity to the center thereof and the engine-driven tool 1 excels in durability.

The metal fixing member 20 is made of iron; therefore, the metal fixing member 20 excels in strength.

The length of the metal fixing member 20 and the thin portion 20b are preferably 70 mm and 40 mm, respectively.

What is claimed is:

1. A knapsack engine-driven tool driven by an engine provided on a knapsack frame, comprising a supporting tool composed of a hollow tube made of a moveable rigid material, whose base end is fixed onto said knapsack frame, in which the hollow tube can be held in a desired shape, a means for operating said engine provided on a second end of the hollow tube opposite said base end, a regulating wire extends through the hollow tube connecting said engine and said operating means, and a flexible member covering said hollow tube, and further comprising a metal fixing member disposed between said hollow tube and said means for operating said engine to inhibit bending of said hollow tube proximate said operating means.

2. The knapsack engine-driven tool as claimed in claim 1, wherein said metal fixing member is made of iron.

3. A knapsack engine driven tool comprising:
   a frame;
   an engine mounted to said frame for driving a tool;
   a hollow tube having a base end fixed to said frame;
   an operating means for operating said engine provided on a second end of said hollow tube opposite said base end;
   a regulating wire extending through said hollow tube and connecting said engine and said operating means to allow remote operation of said engine from said second end of said hollow tube;
   a flexible member disposed about and covering said hollow tube; and
   a substantially rigid fixing member disposed between said hollow tube and said operating means and extending away from said operating means to inhibit bending of said hollow tube proximate said operating means.

4. The knapsack engine driven tool according to claim 3, wherein, said operating means comprises a grip having a throttle lever and a starting switch;
   said regulating wire includes a throttle wire connected to said throttle lever and said engine for controlling a speed of said engine and a second wire connecting said starting switch to said engine for starting and stopping said engine;
   said hollow tube extending within a portion of sa id grip,
   said substantially rigid fixing member having a thick portion at least partially disposed within and engaging said grip portion and disposed about said hollow tube, and a thin portion extending from said thick portion and away from said grip portion about said hollow tube to inhibit bending of said hollow tube.

5. The knapsack engine driven tool according to claim 4, wherein said flexible member is connected to said grip and is disposed about said thin portion of said substantially rigid fixing member.

6. The knapsack engine driven tool according to claim 5, wherein said hollow tube is formed of a rigid band wound spirally about itself to provide protection around said wire while allowing said hollow tube to move into a desired shape.

7. The knapsack engine driven tool according to claim 6, wherein said rigid band comprises a plurality of bent sides adjacent one another and spirally wound in such a manner to allow said hollow tube to maintain said desired shape and requiring an applied force to change its shape.

8. The knapsack engine driven tool according to claim 3, wherein said hollow tube is formed of a rigid band wound spirally about itself to provide substantial rigid protection around said wire while allowing said hollow tube to move into a desired shape.

9. The knapsack engine driven tool according to claim 8, wherein said rigid band comprises a plurality of bent sides adjacent one another and spirally wound in such a manner to allow said hollow tube to maintain said desired shape and requiring an applied force to change its shape.

10. The knapsack engine driven tool according to claim 1, wherein, said operating means comprises a grip;
    said hollow tube extending within a portion of said grip,
    said substantially rigid fixing member having a thick portion at least partially disposed within and engaging said grip portion and disposed about said hollow tube, and a thin portion extending from said thick portion and away from said grip portion about said hollow tube to inhibit bending of said hollow tube.

11. The knapsack engine driven tool according to claim 10, wherein said flexible member is connected to said grip and is disposed about said thin portion of said substantially rigid fixing member.

12. The knapsack engine driven tool according to claim 11, wherein said hollow tube is formed of a rigid band wound spirally about itself to provide protection around said wire while allowing said hollow tube to move into a desired shape.

13. The knapsack engine driven tool according to claim 12 wherein said rigid band comprises a plurality of bent sides adjacent one another and spirally wound in such a manner to allow said hollow tube to maintain said desired shape and requiring an applied force to change its shape.

14. The knapsack engine driven tool according to claim 13, wherein the grip includes a throttle lever and a starting switch;
    said regulating wire includes a throttle wire connected to said throttle lever and said engine for controlling a speed of said engine and a second wire connecting said starting switch to said engine for starting and stopping said engine.

* * * * *